3,103,535
OXIDATION OF ALDEHYDES TO CARBOXYLIC ACIDS USING PHOSPHATE IONS TO PRECIPITATE INTERFERING METAL IONS
Gordon Howard Whitfield and Edward Kemp, both of Norton-on-Tees, England, assignors to Imperial Chemical Industries Limited, London, England, a corporation of Great Britain
No Drawing. Filed Mar. 10, 1960, Ser. No. 13,999
Claims priority, application Great Britain Mar. 23, 1959
6 Claims. (Cl. 260—530)

This invention relates to the production of aliphatic carboxylic acids.

It is well known to oxidise aliphatic aldehydes to aliphatic carboxylic acids by contacting them with a gas containing free oxygen, for example, air or pure oxygen, the reaction being carried out at an elevated temperature and possibly at an elevated pressure. The reaction may, if desired, be facilitated by the presence of catalysts, which are preferably salts of metals of variable valency, for example manganese and cobalt. Thus, propionaldehyde may be oxidised to propionic acid in the presence of a catalyst such as manganese naphthenate or cobalt naphthenate. By working in this manner, high conversions of aldehyde may be achieved but the yield of acid is not as high as is desirable. For instance, propionaldehyde has been oxidised using manganese naphthenate as catalyst, pure oxygen being used as the oxidising gas and the reaction being carried out at a temperature in the range of 45 to 60° C. When operating in this manner, a propionaldehyde conversion at least as high as 95% may be obtained, but the yield of propionic acid is in general only in the vicinity of 80%. This represents a substantial loss of propionaldehyde. A process capable of decreasing this loss would be of considerable technical value.

In a similar manner, yields may be decreased by metal ions present inadvertently in the reaction mixture. For example, iron and/or nickel ions may be present because of the corrosion of metals used in the construction of the plant in which the reaction is to be carried out. Again, metal ions may be present in the reaction mixture owing to to mode of preparation of the aldehyde starting material. Thus, if the aldehyde has been produced by the so-called Oxo process, the aldehyde may contain cobalt ions. It is believed that the metal ions provided deliberately or present inadvertently in the reaction mixture tend to promote undesirable side reactions and that in consequence the yield of desired aliphatic carboxylic acid falls below the desired level.

We have now found that the addition of phosphate ions to the reaction mixture results in an increase in the yield of desired carboxylic acid.

Thus, according to the present invention, there is provided a process for the production of aliphatic carboxylic acids by contacting an aldehyde with a gas containing free oxygen, the said process being one in which compounds of one or more metals of variable valency are present in the reaction mixture, and being characterised in that phosphate ions are provided initially in the mixture in an amount sufficient to convert the said compounds to their corresponding phosphates.

Ortho-, meta- and pyrophosphate ions are suitable for use in the process of the present invention. It may be, however, that under the reaction conditions normally employed metaphosphates and pyrophosphates are converted to orthophosphates.

The phosphate ions may be introduced in any convenient manner. For example, they may be added to the reaction mixture in the form of salts of alkali or alkaline earth metals. Alternatively, phosphoric acid itself may be added, preferably in the form of an aqueous solution or dissolved in a lower carboxylic acid such as propionic acid.

The addition of a phosphate to a reaction mixture containing for example, a manganese salt as catalyst causes this manganese salt to be converted to manganese phosphate, which is formed as a colloidal precipitate. It is a possible explanation of the improved yield of aliphatic carboxylic acid that this colloidal precipitate of manganese phosphate is a more selective catalyst for the oxidation of an aliphatic aldehyde to the corresponding aliphatic carboxylic acid than are the more usual salts of manganese introduced as oxidation catalysts, for example, manganese naphthenate. Thus, the oxidation of propionaldehyde to propionic acid in the presence of a small amount of manganese naphthenate has been carried out at a temperature in the vicinity of 60° C. with a conversion of propionaldehyde of 95% and a yield of propionic acid of 80%. In the presence of an amount of phosphate ions (introduced by the addition of $NaH_2PO_4.2H_2O$) sufficient to convert all of the manganese naphthenate to manganese phosphate, the propionaldehyde conversion on oxidation was 92%, while the yield of propionic acid increased to 97.5%.

It is believed that the effect of the presence of phosphate ions is similar in the case of other metals such as iron, nickel and cobalt, irrespective of whether these are present deliberately as catalysts, or as contaminants arising from corrosion, or as impurities in the aliphatic aldehyde starting materials. In all cases, the metal compound may be converted to a metal phosphate which has a decreased catalytic influence on undesirable side reactions. On the other hand, it may be that the beneficial effect of the phosphate ions is simply due to the low solubility of the compound formed from the metal ions and the phosphate ions decreasing the concentration of metal ions to a harmless level. It must be pointed out that the present invention is in no way dependent upon the correctness of these theories.

The process of the present invention may be employed at temperatures in the range of 30 to 150° C. and preferably at 40 to 100° C. The pressure employed in the process may be atmospheric or superatmospheric. Usually, the pressure of operation should not exceed 30 atmospheres and in particular pressures not exceeding 10 atmospheres are most important.

A wide range of aldehydes, for example, acetaldehyde, propionaldehyde and aldehydes containing 4 or more carbon atoms may be employed. The oxidation may be conducted as a batch or continuous process, and may be operated in the presence of a solvent. A particularly suitable solvent is the carboxylic acid identical in nature with the acid produced in the process. The oxidation of propionaldehyde to propionic acid is an important reaction which may be carried out by the process of the present invention. This reaction is suitably operated in the presence of propionic acid as solvent.

*Example 1*

200 grams of a liquid containing 191.8 grams of propionaldehyde were introduced together with 0.224 gram of manganese naphthenate containing 10% by weight of manganese into a glass oxidation vessel. The vessel was immersed in a water bath heated to 45° C. and oxygen was passed through the liquid at a rate of 12 litres per hour, provision being made for the oxygen to be highly dispersed. The temperature of the reaction mixture was raised as quickly as possible to 60° C. After operation had been continued for six hours, the process was terminated and the product was weighed and analysed. It was found that 9.4 grams of unchanged propionaldehyde were present while 186.8 grams of propionic acid had been formed. These figures correspond to a propionaldehyde conversion of 95% and a propionic acid yield of 80%.

The process as described above was repeated except that 0.572 gram of $NaH_2PO_4 \cdot 2H_2O$ was included in the reaction mixture and the duration of the oxidation was 6½ hours. From the product, 15.2 grams of unchanged propionaldehyde were recovered, this corresponding to a conversion of 92%. It was shown that in the reaction, 219.6 grams of propionic acid had been produced, this corresponding to a yield of 97.5%.

*Example 2*

Example 1 was repeated, except that 0.35 gram of $H_3PO_4$, dissolved in 2 grams of propionic acid, was added to the reaction mixture and the reaction was carried out for 7 hours. The product contained 11.8 grams of propionaldehyde, this corresponding to a propionaldehyde conversion of 94.0%. An analysis of the reaction product showed that 208.1 grams of propionic acid had been produced, this corresponding to a propionic acid yield of 90.5%.

*Example 3*

0.2 gram of iron powder was dissolved in 2.0 grams of propionic acid and this was added to 200 grams of a liquid containing 191.8 grams of propionaldehyde present in a glass oxidation vessel. This vessel was immersed in a water bath heated to 45° C. and oxygen was passed through the liquid at a rate of 12 litres per hour, provision being made for the oxygen to be highly dispersed. The temperature of the reaction mixture was raised as quickly as possible to 60° C. and operation was continued for 9 hours. An analysis of the products showed that 14.9 grams of the propionaldehyde remained unconverted, this corresponding to a propionaldehyde conversion of 92%. It was found that 181.6 grams of propionic acid had been produced, this corresponding to a yield of 80%.

The process was repeated, except that the reaction mixture also contained 0.175 gram of $H_3PO_4$, and the oxidation was only continued for 6½ hours. An analysis of the products showed that 3.1 grams of propionaldehyde remained unconverted, this corresponding to a propionaldehyde conversion of 98.4%. The weight of propionic acid produced in this process was 216.7 grams, this corresponding to a propionic acid yield of 90%.

*Example 4*

0.04 gram of cobalt naphthenate containing 10% by weight of cobalt was added to 200 grams of a liquid containing 191.8 grams of propionaldehyde present in a glass oxidation vessel. Oxidation was carried out as described in Example 3, the duration of this being 6½ hours. From the product, 4.3 grams of propionaldehyde were recovered, this corresponding to a propionaldehyde conversion of 98%. The analysis of the product indicated that 186.1 grams of propionic acid had been produced, this corresponding to a propionic acid yield of 78%.

When the process was repeated in the presence of 0.175 gram of $H_3PO_4$, oxidation in this case taking 7 hours, 2.4 grams of propionaldehyde were recovered, this corresponding to a propionaldehyde conversion of 98.6%. It was found that, during the reaction, 208.1 grams of propionic acid had been produced, this corresponding to a propionic acid yield of 86%.

We claim:

1. A process for the production of saturated unsubstituted aliphatic carboxylic acids containing from two to four carbon atoms which comprises contacting the corresponding aliphatic aldehyde at a temperature of 30° to 150° C. and at a pressure of at most 30 atmospheres with a gas containing free oxygen, the reaction mixture also containing ions of at least one metal selected from the group constituting of iron, nickel, cobalt and manganese, and adding phosphate ions initially to said reaction mixture in an amount sufficient to convert said metal ions to their corresponding insoluble phosphates, said phosphate ions being added in the form of a member selected from the group consisting of phosphoric acid and soluble ortho-, meta-, and pyrophosphates of alkali metals.

2. A process according to claim 1 wherein the phosphate ions are added in the form of an alkali metal orthophosphate.

3. A process according to claim 1 wherein the phosphate ions are added in the form of phosphoric acid.

4. A process according to claim 1 wherein the reaction is carried out in the presence of a solvent which is the acid produced in the process.

5. A process according to claim 1 wherein the aldehyde is propionaldehyde.

6. A process for the continuous production of propionic acid which comprises oxidizing propionaldehyde at a temperature of 30° to 150° C. and at a pressure of at most 30 atmospheres in the presence of propionic acid as solvent with a free oxygen gas, the reaction mixture also containing ions of at least one metal selected from the group consisting of iron, nickel, cobalt and manganese, adding phosphate ions initially to said reaction mixture in an amount sufficient to convert said metal ions to their corresponding insoluble phosphates, said phosphate ions being added in the form of a member selected from the group consisting of phosphoric acid and soluble ortho-, meta-, and pyrophosphates of alkali metals, and recycling a portion of the propionic acid to the reaction mixture with additional propionic acid for further and continuous production of additional propionic acid.

References Cited in the file of this patent

UNITED STATES PATENTS

| | | |
|---|---|---|
| 1,951,789 | Mueller-Cunradi | Mar. 20, 1934 |
| 2,456,549 | Weizmann | Dec. 14, 1948 |

FOREIGN PATENTS

| | | |
|---|---|---|
| 154,680 | Great Britain | Nov. 29, 1920 |